United States Patent
Iacopetta

(10) Patent No.: US 11,898,681 B2
(45) Date of Patent: Feb. 13, 2024

(54) SYSTEM AND METHOD FOR MOUNTING SHUT-OFF VALVES OR ADAPTERS IN AN IRRIGATION SYSTEM

(71) Applicant: TECO S.R.L., Trani (IT)

(72) Inventor: Cosimo Iacopetta, Bisceglie (IT)

(73) Assignee: TECO S.R.L., Trani (IT)

( * ) Notice: Subject to any disclaimer, the term of this patent is extended or adjusted under 35 U.S.C. 154(b) by 323 days.

(21) Appl. No.: 17/306,234

(22) Filed: May 3, 2021

(65) Prior Publication Data

US 2021/0348707 A1    Nov. 11, 2021

(30) Foreign Application Priority Data

May 5, 2020   (IT) .......................... 102020000009964

(51) Int. Cl.
*F16L 41/14* (2006.01)
*F16L 41/16* (2006.01)

(52) U.S. Cl.
CPC .............. *F16L 41/14* (2013.01); *F16L 41/16* (2013.01); *Y10T 29/49826* (2015.01)

(58) Field of Classification Search
CPC . F16L 41/14; F16L 41/16; F16L 41/04; F16L 41/08; F16L 41/12
USPC ....................................... 285/5, 39
See application file for complete search history.

(56) References Cited

U.S. PATENT DOCUMENTS

| | | | | |
|---|---|---|---|---|
| 980,901 | A * | 1/1911 | Ballantyne | F16L 41/14 |
| 1,364,814 | A * | 1/1921 | Saucke | F16L 41/14 |
| 3,716,257 | A * | 2/1973 | Hackman | F16L 41/14 |
| 4,654,942 | A | 4/1987 | Rush et al. | |
| 2003/0173777 | A1 | 9/2003 | Jeong | |
| 2007/0277893 | A1* | 12/2007 | Belford | F16L 41/14 |
| 2008/0030021 | A1* | 2/2008 | Theilen | F16L 41/14 |

FOREIGN PATENT DOCUMENTS

| | | | | |
|---|---|---|---|---|
| DE | 10047758 A1 * | 5/2001 | | F16L 41/14 |
| KR | 200412128 Y1 * | 3/2006 | | |
| WO | 99/45307 A1 | 9/1999 | | |
| WO | WO-2014085867 A1 * | 6/2014 | | F16L 41/14 |

OTHER PUBLICATIONS

DE 10047758 A1—Machine Translation—English (Year: 2001).*
KR 200412128 Y1—Machine Translation—English (Year: 2006).*
EP Search Report for EP 21 16 7363 dated Sep. 23, 2021, 1 page.
IT Search Report for IT 202000009964 dated Jan. 14, 2021, 1 page.

* cited by examiner

*Primary Examiner* — William S. Choi
(74) *Attorney, Agent, or Firm* — Browdy and Neimark, PLLC

(57) ABSTRACT

A system for mounting an adapter on a main flexible pipe for connecting a branch pipe is described, including a fitting having an externally threaded shank and a widened base which can be inserted in a hole of the pipe and can be fixed by a first ring nut screwed on the threaded shank, wherein the system includes a tool for inserting the fitting in the hole and for tightening the first ring nut, and wherein on the adapter a second ring nut is provided for fixing the adapter to the fitting.

12 Claims, 8 Drawing Sheets

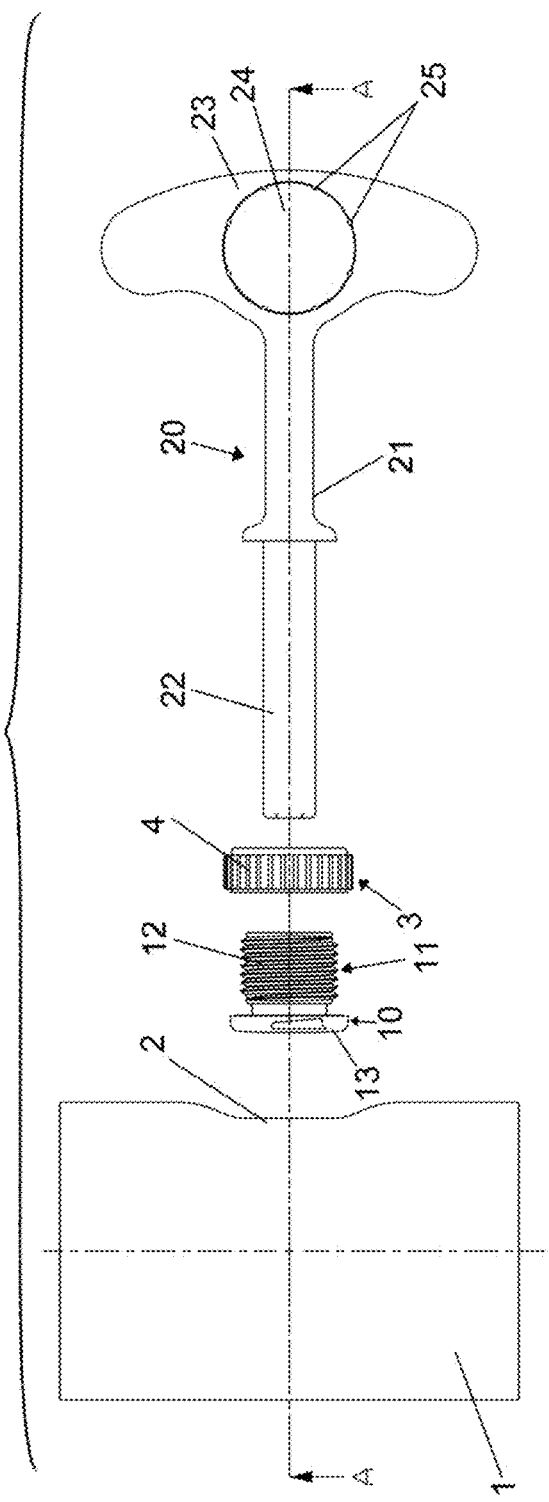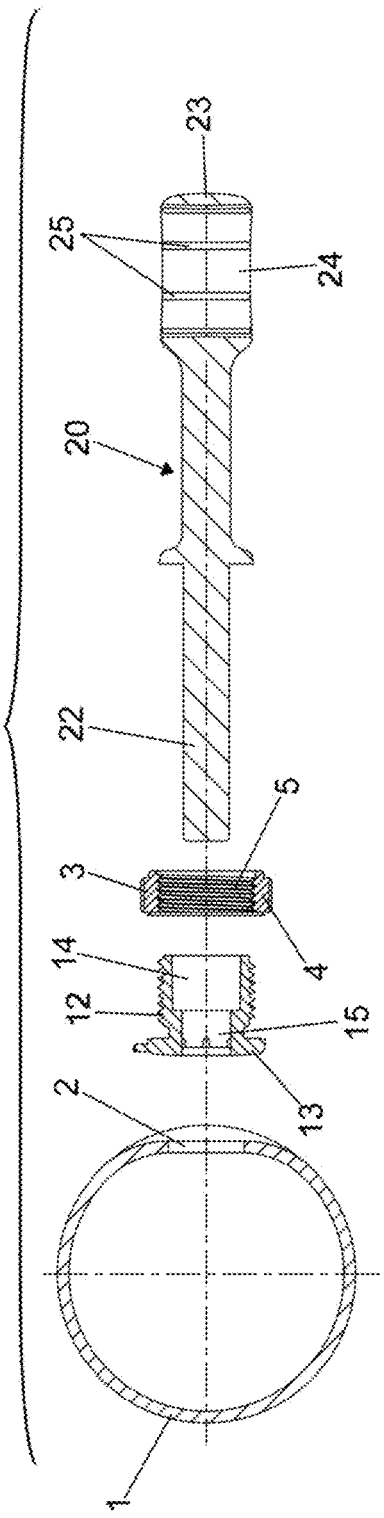

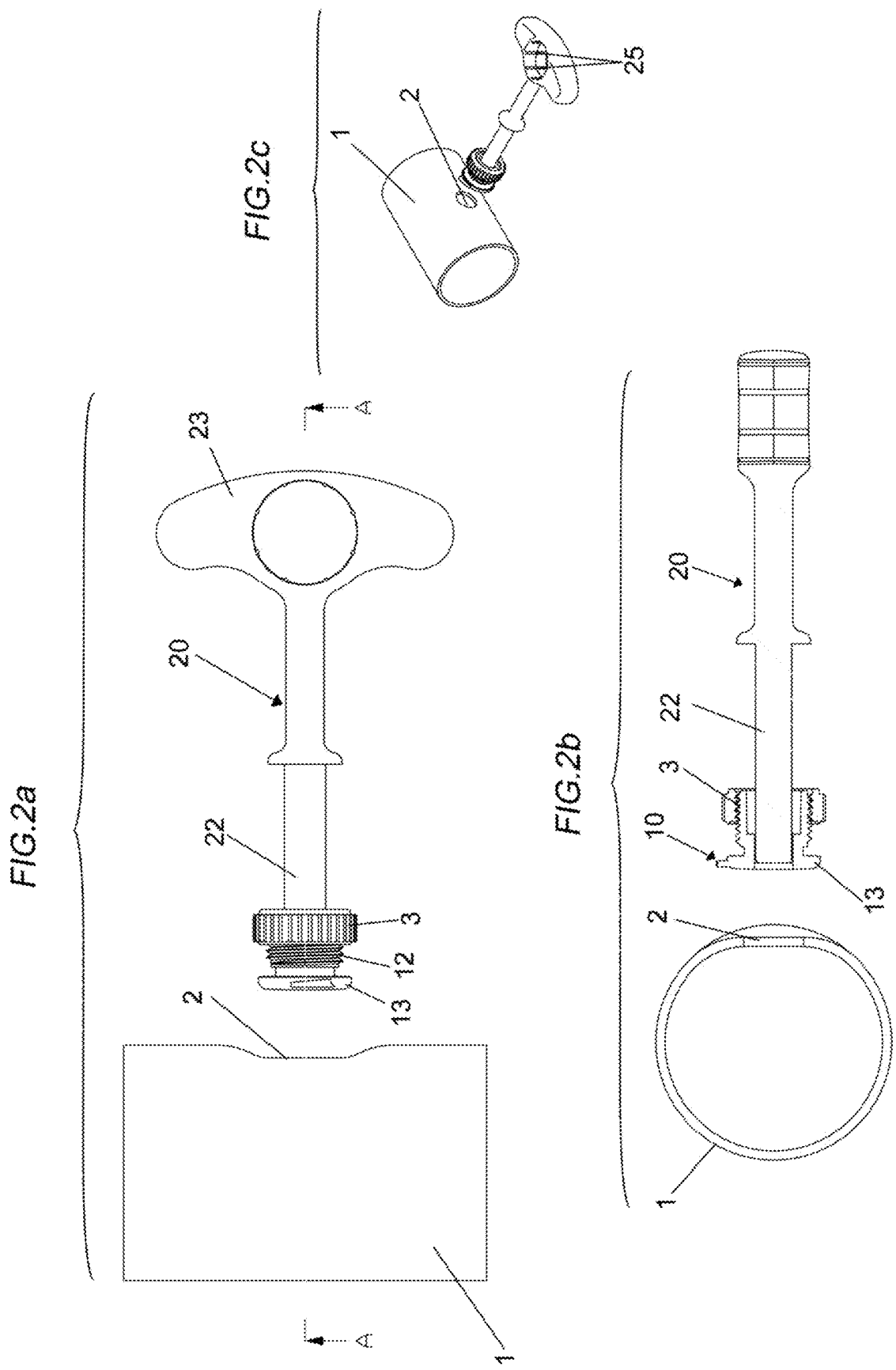

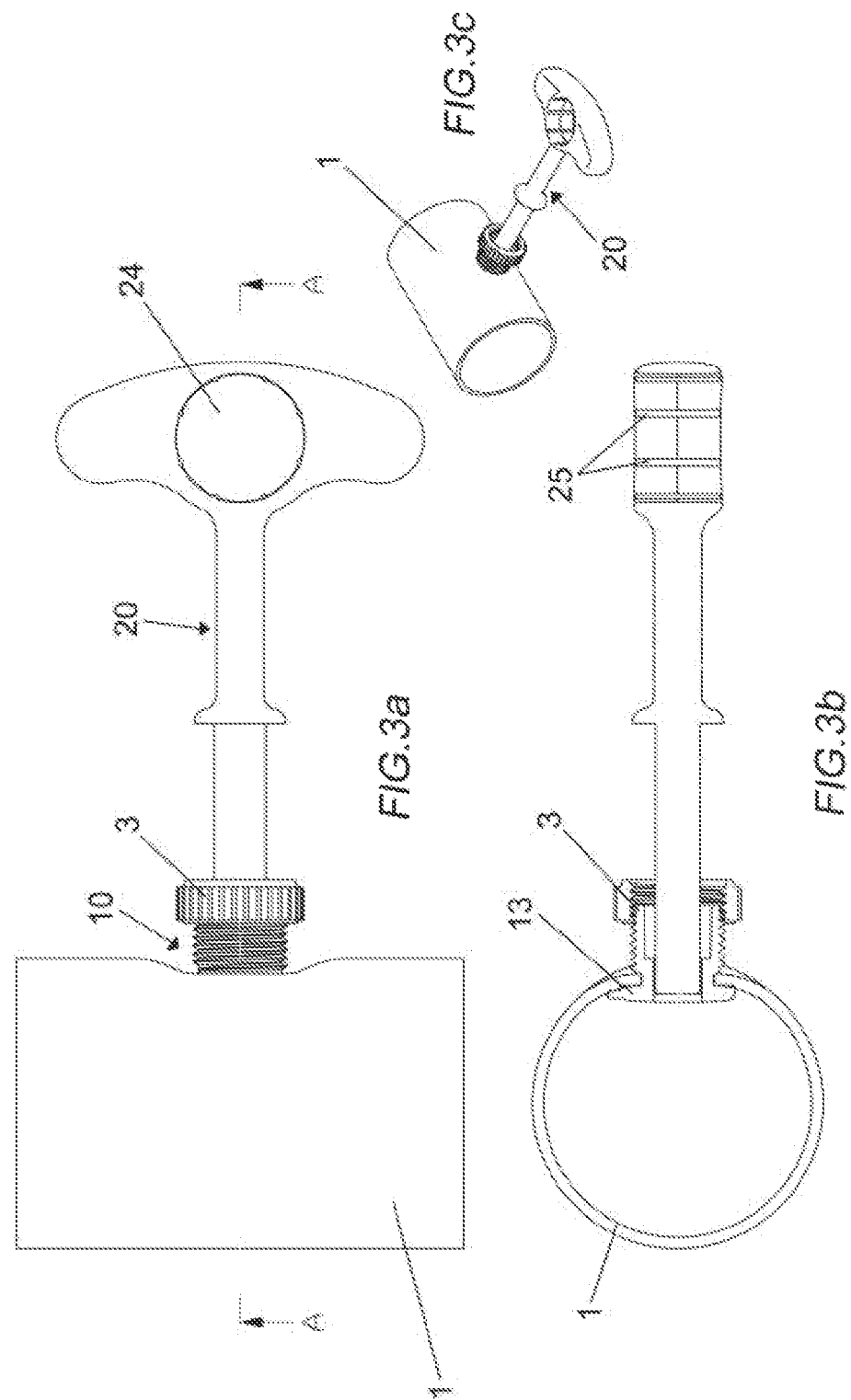

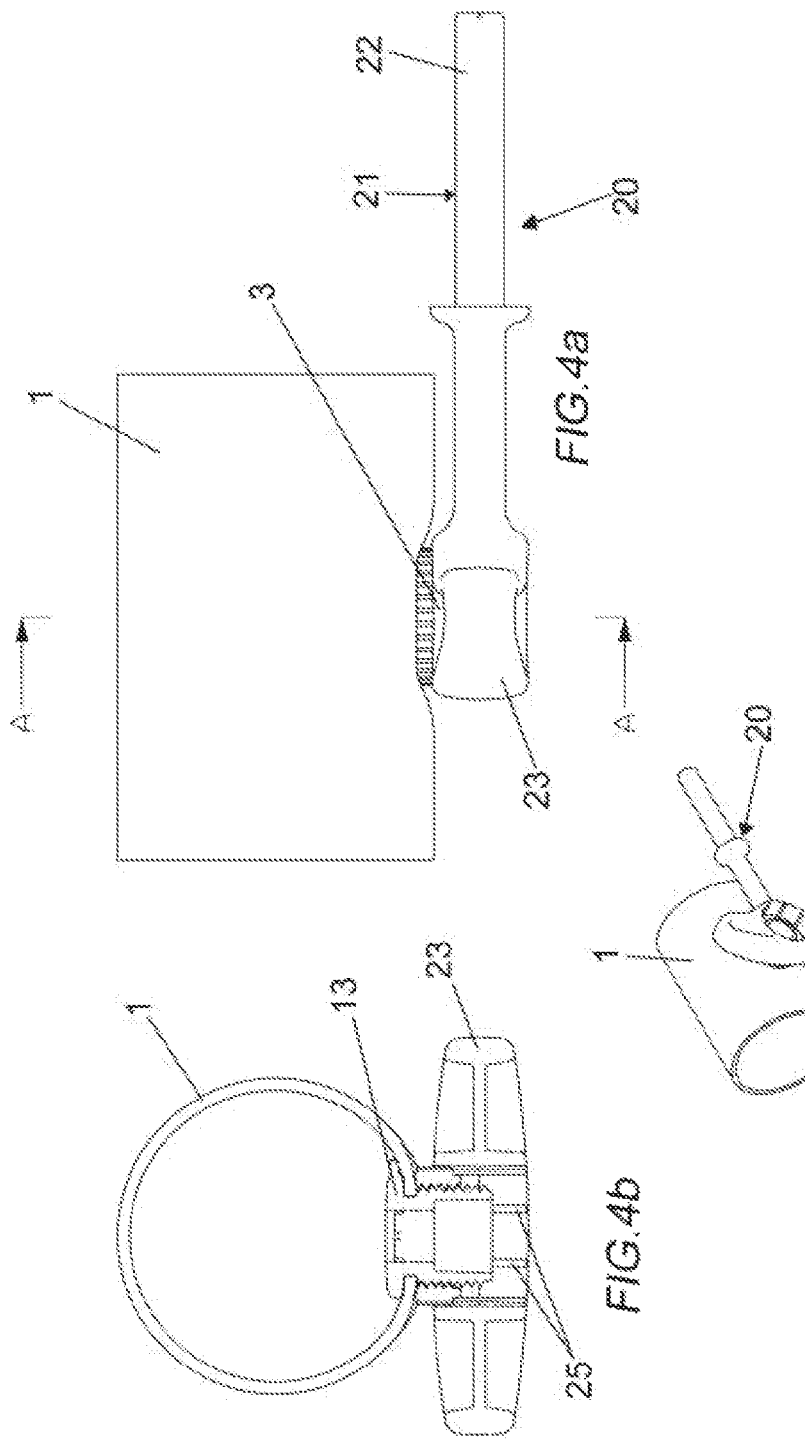

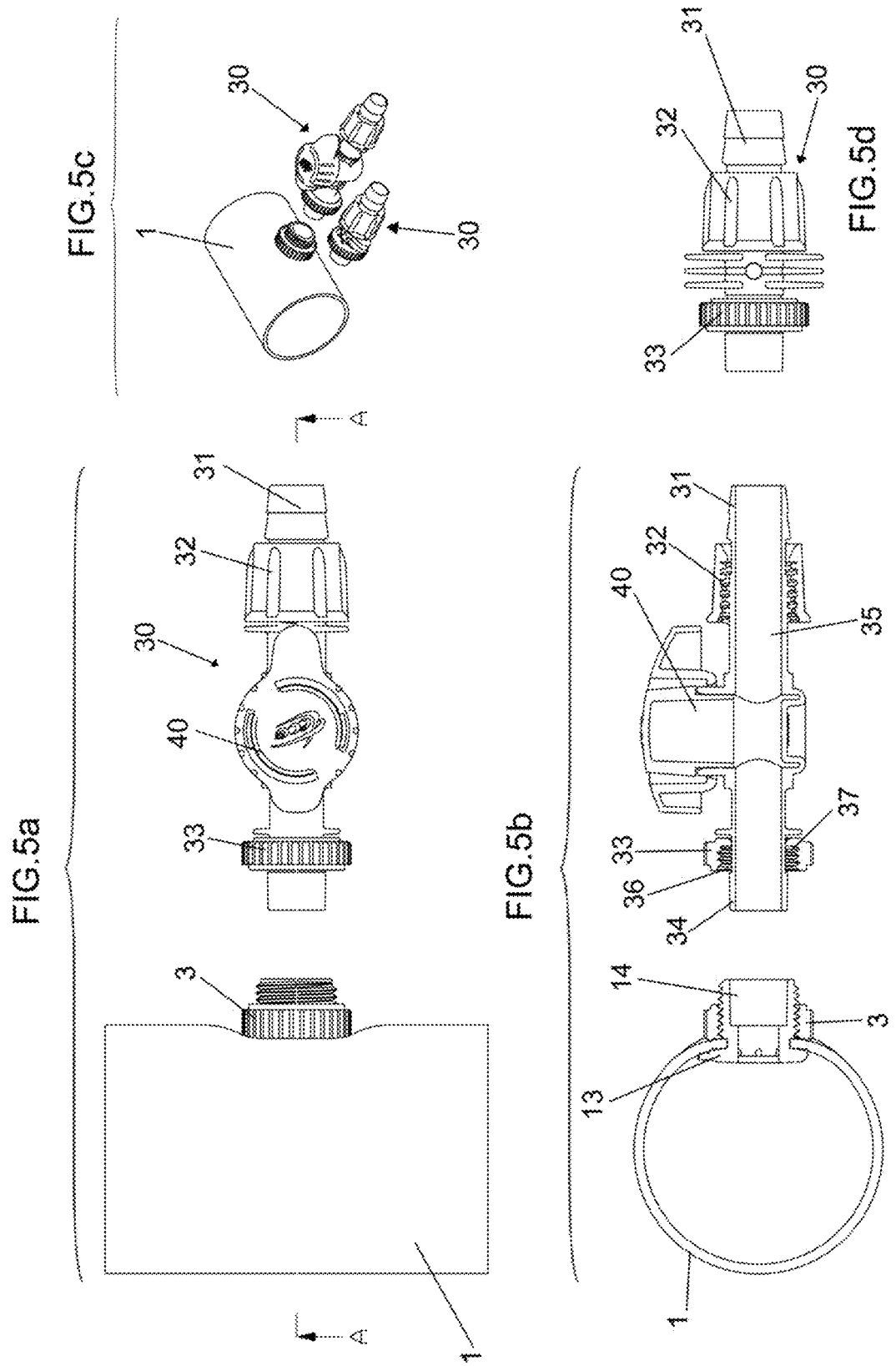

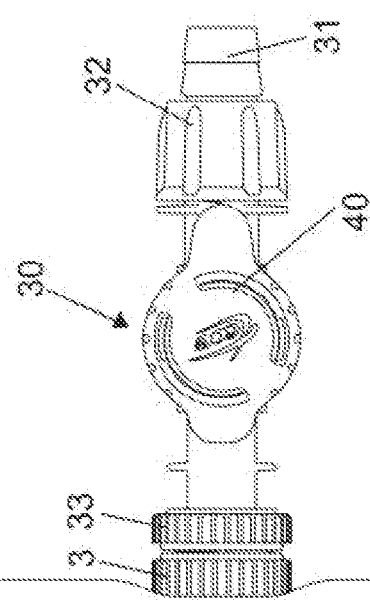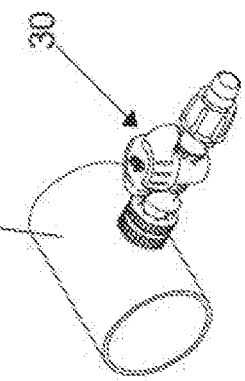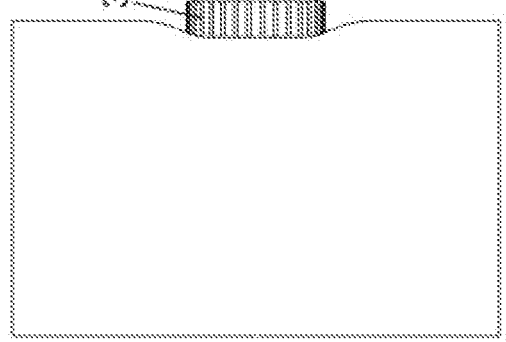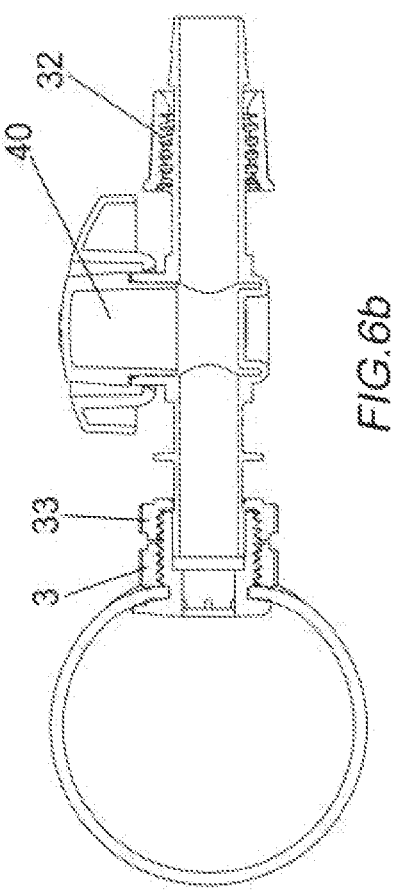
FIG.6a
FIG.6c
FIG.6b

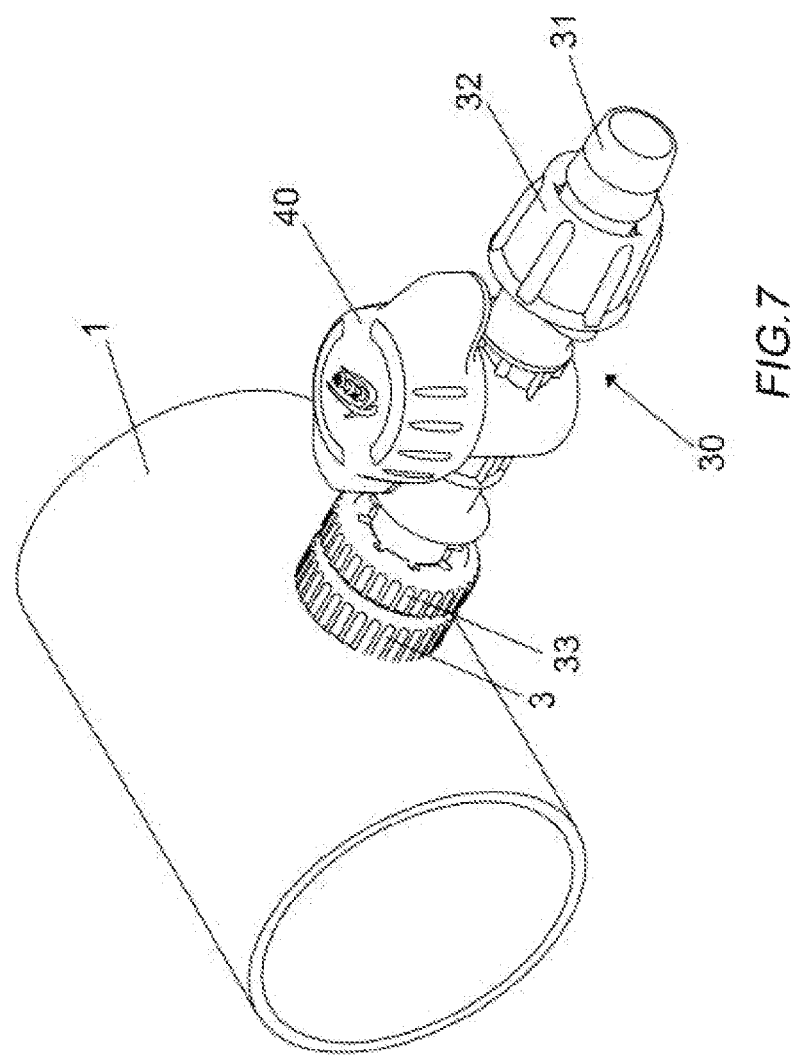

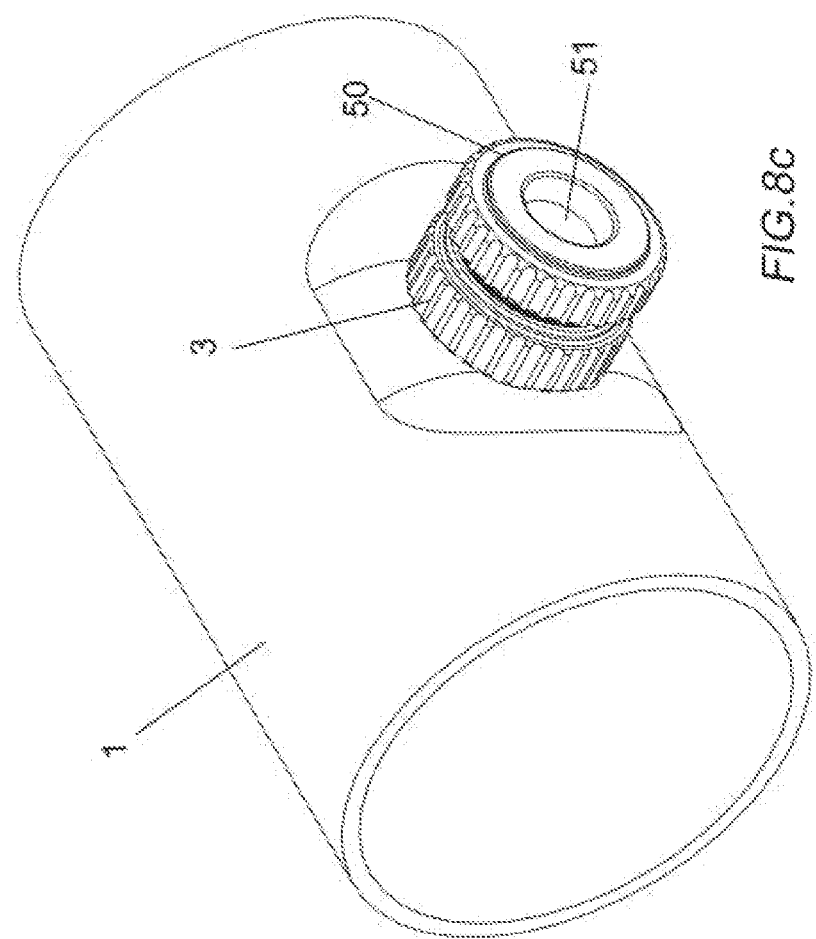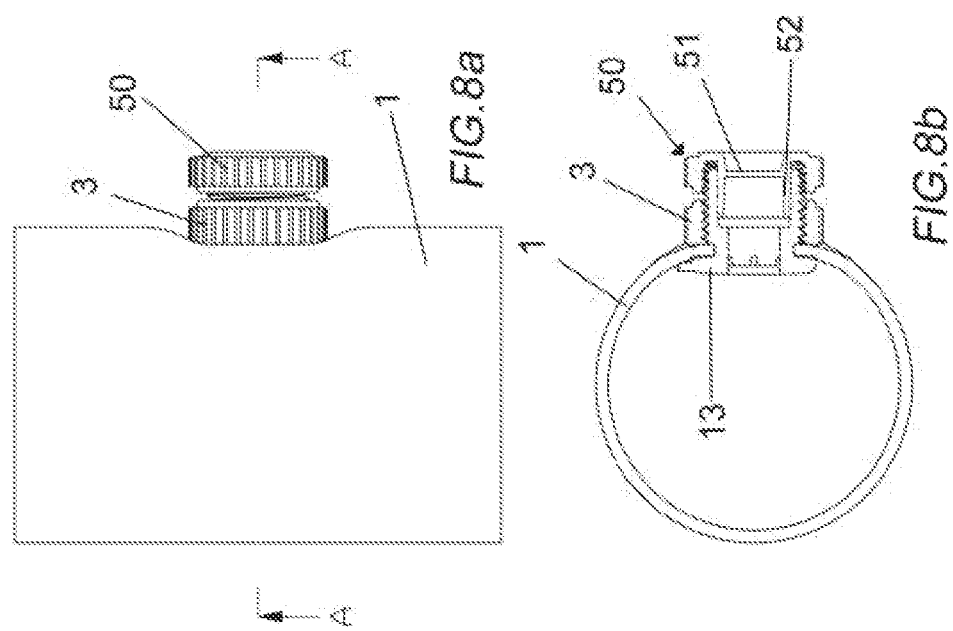

SYSTEM AND METHOD FOR MOUNTING SHUT-OFF VALVES OR ADAPTERS IN AN IRRIGATION SYSTEM

This application claims priority to IT Patent Application No. 102020000009964 filed 5 May 2020, the entire contents of which is hereby incorporated by reference.

BACKGROUND OF THE INVENTION

Field of the Invention

The subject of the present invention is a system and a method for mounting a shut-off valve or an adapter in an irrigation system.

More particularly, but not exclusively, the invention relates to systems of irrigation of horticultural crops such as tomatoes, peppers, lettuce, etc.

Description of the Related Art

Being seasonal crops, the irrigation system is of a temporary type, linked to the duration of the cultivation. Consequently, flexible pipes are normally used, very similar to the pipes used in fire-fighting systems, which are easy to unwind at the start of cultivation and rewind at the end of cultivation.

Therefore, these systems normally comprise a flexible pipe of considerable size which starts from a water supply point, which can be the water network or a pipeline coming from a well or groundwater, to which smaller diameter pipes are connected, also of a flexible or rigid nature, which run along the rows of crops to irrigate them.

Upstream of at least some of these pipes connected to the main pipe there are shut-off valves, which make it possible to regulate the quantity of liquid delivered by the various (groups of) dispensers and, optionally, to divide the network into sections to be used separately, if necessary, to meet specific needs.

The systems currently used to connect a branch pipe to the main flexible pipe with a simple adapter, or with an adapter provided with a shut-off valve, normally involve manually attaching both a fitting to the flexible pipe and the adapter to the fitting. As a result, the tightness is not guaranteed and there is a risk of detachment of the adapter in the case of strong water pressure.

SUMMARY OF THE INVENTION

The object of the invention is to eliminate the disadvantages of the prior art.

More particularly, an object of the invention is to provide a system for mounting an adapter, with or without shut-off valve, on a flexible pipe, which guarantees an excellent tightening of the fitting to the pipe and of the adapter to the fitting, and therefore an excellent tightness even in the presence of strong pressures.

Another object of the invention is to provide such a system which allows easy mounting without requiring hand tightening by the operator.

Yet another object of the invention is to provide such a system which is simple and inexpensive to manufacture.

These and other objects of the invention are achieved with the features disclosed and claimed, including multiple advantageous embodiments.

Substantially, the system for mounting an adapter on a main flexible pipe of an irrigation system for the connection of a branch pipe according to the invention, comprises a fitting having an externally threaded shank and a widened base that can be inserted in a hole of the main flexible pipe and can be fixed by means of a first ring nut screwed on said threaded shank, wherein said system comprises a tool for the insertion of said fitting in said hole and for tightening said first ring nut, and wherein a second ring nut is provided on said adapter for fixing the adapter to the fitting.

BRIEF DESCRIPTION OF THE DRAWINGS

Further features of the invention will be made clearer by the following detailed description, referring to a purely illustrative, and therefore non-limiting, embodiment thereof illustrated in the accompanying drawings, in which:

FIGS. 1a and 1b are, respectively, a plan view and a median section along line A-A of FIG. 1a of a blown-up view showing a piece of flexible pipe, of a fitting to be mounted on the flexible pipe and a spanner used for this mounting;

FIGS. 2a, 2b are views similar to FIGS. 1a, 1b, and FIG. 2c is a smaller scale axonometric view, showing a subsequent step of mounting of the fitting on the flexible pipe;

FIGS. 3a, 3b, 3c and 4a, 4b, 4c are views similar to FIGS. 2a, 2b, 2c, showing further steps of mounting of the fitting on the flexible pipe;

FIGS. 5a, 5b, 5c, 5d are views similar to the previous ones, showing an adapter and an adapter with shut-off valve (the latter also shown in section) in the step of mounting on the fitting;

FIGS. 6a, 6b, 6c are views similar to the previous ones, showing an adapter with shut-off valve mounted on the fitting;

FIG. 7 is an enlarged view of FIG. 6c, showing an adaptor with shut-off valve mounted on the fitting; and FIGS. 8a, 8b and 8c are, respectively, a plan view, a median section along line A-A of FIG. 8a and an enlarged axonometric view showing the fitting according to the invention closed by a cap ring nut.

DESCRIPTION OF THE PREFERRED EMBODIMENTS

Referring to these drawings, the system for mounting a shut-off valve or an adapter on a flexible pipe of an irrigation system according to the invention is now described.

Here below, for the sake of simplicity, an adapter, i.e. an element that allows the connecting of a branch pipe to the main flexible pipe, will be referred to more extensively, it being understood that such an adapter, according to needs, may incorporate a shut-off valve, as previously explained and as will be stated here below.

FIGS. 1 to 4 show successive steps of mounting of a fitting on a flexible pipe using an appropriate spanner.

In these drawings the flexible pipe has been denoted by reference numeral 1 and is presented in a flattened form, unwound from a roll, before installation, and takes on the cylindrical shape shown in views b) after the feeding of the fluid, in particular water.

Beforehand a hole 2, of circular shape, is formed in the pipe 1, conveniently shearing, with a tool having a semicircular profile, the overlapping portions of the flattened pipe, for the insertion therein of a fitting 10 by means of a tool or spanner 20, and tightening by means of a ring nut 3.

The fitting 10 has a hollow shank 11 with an external thread 12, and a widened base 13 of larger diameter than the diameter of the hole 2, in such a way that once inserted therein it cannot exit.

The internal cavity of the shank 11 has a first section 14 with a circular cross section for the purposes to be mentioned here below, and a second section 15 with a square or more generally polygonal cross section.

The tool 20 has a stem 21 with an end section 22 having a square or polygonal cross section, suitable for engaging in said innermost section 15 of the cavity of the shank 11 of the fitting 10, and a grip 23, in which a circular hole 24 with small internal protrusions 25 is formed for engaging with an external knurl 4 of the ring nut 3 having an internal thread 5.

In order to facilitate the insertion of the base 13 of the fitting 10 in the hole 2 of the pipe 1, the ring nut 3 is partially screwed onto the shank 11 of the fitting and the fitting-ring nut assembly is accommodated on the tool 20 so that the tip 22 of the latter engages the square hole 15 of the fitting, preventing relative rotations between said elements, as shown in FIGS. 2a)-c).

An axial force can then be exerted on the fitting 10 with the tool 20, arranging it slightly inclined, so as to facilitate insertion of its base 13 in the hole 2, as shown in FIGS. 3a)-c).

Subsequently, the ring nut 3 is tightened on the fitting 10 by means of the tool 20, which is gripped on the side of the stem 21 so that the hole 24 with internal protrusions 25, acting as a spanner, engages the external knurl 4 of the ring nut 3, as shown in FIGS. 4a)-c).

Once the fitting 10 has been mounted on the pipe 1, an adapter 30 for connecting a branch pipe (not shown) for irrigating the plants by means of a series of nozzles, drippers or holes distributed along its extension is to be attached thereto.

The adapter 30, in its simplest form shown in a view of FIGS. 5c and 5d, is made up of a hollow pipe 35, which on one side has means for attachment to the fitting 10 and on the other has a conical section 31 on which, in a manner in itself known, a branch pipe is fitted, which is locked in position by means of a ring nut 32.

In the other views of FIGS. 5 and 6, a shut-off valve 40 is placed on the adapter, which is again denoted by reference numeral 30, for regulating the flow in the branch pipe. The shut-off valve 40 is in itself known and is therefore not described further.

The means for attaching the adapter 30, with or without the shut-off valve, to the fitting 10, consist of a ring nut 33 mounted on a corresponding end 34 of the pipe 35 where a step 36 is provided to prevent the exiting thereof.

The end 34 of the pipe 35 of the adaptor 30 has a diameter such that it is housed with precision in the first section with circular cross section 14 of the shank 11 of the fitting 10, and the ring nut 33 has an internal thread 37 so as to screw onto the external thread 12 of the fitting 10 for a firm securing of the adapter, as shown in FIGS. 6a)-c).

The use of the second ring nut 33 enables a tight fixing of the adapter 30 to the fitting 10 to be obtained, without risks of detachment, even in the case of strong pressures of the fluid medium.

FIG. 7 is an enlargement of FIG. 6c and shows an adapter 30 provided with a shut-off valve 40 applied to the flexible pipe 1 by means of the fitting 10.

FIGS. 8a)-c) show an accessory of the system according to the invention, made up of a ring nut 50, which is screwed onto the threaded shank 11 of the fitting 10. The ring nut 50 has internally a tubular protrusion 52 which is placed in the hollow section 14 of the shank 11, and a transverse wall 51 so as to form a plug which closes the fitting 10 tightly.

The ring nut 50 can be used to close the outlet hole 2 where the fitting 10 is inserted, for example, at the end of the season to prevent soil debris from entering the pipe during rewinding, or also to plug the existing hole and be able to make a new branch in a different point, if necessary.

From what has been stated, the advantages of the system according to the invention, which allows an adapter for connecting a branch pipe to a main flexible to be attached simply, rapidly and safely, are made clear.

Naturally the invention is not limited to the particular embodiment previously described and illustrated in the accompanying drawings, but numerous detailed changes may be made thereto, within the reach of the person skilled in the art, without thereby departing from the scope of the invention itself, as defined in the appended claims.

The invention claimed is:

1. System for mounting an adapter on a main flexible pipe of an irrigation system for the connection of a branch pipe, the system comprising a fitting having an externally threaded shank and a widened base which can be inserted in a hole of the main flexible pipe and fixed by a first ring nut screwing on said threaded shank, and further comprising a tool comprising a spanner for inserting said fitting in said hole and for the tightening of said first ring nut, wherein on said adapter a second ring nut is provided for fixing the adapter to the fitting,
   wherein said shank of the fitting is internally hollow and has a first section with a circular cross section and a second section with a polygonal cross section, said tool comprising a spanner having a stem with an end section with a polygonal cross section, engaging with said polygonal cross section of the shank, and a grip with a hole provided with protrusions for engagement with an external knurling of said first ring nut.

2. The system according to claim 1, wherein said adapter comprises a hollow pipe provided at one end with a conical section on which a branch pipe can be fitted which can be fixed by a third ring nut, and provided at the other end with said second ring nut which can be screwed onto said externally threaded shank of the fitting.

3. The system according to claim 2, wherein said other end of the hollow pipe of the adapter has a diameter such as to be housed in a first section with circular cross section of said shank and externally has a step apt to prevent the removal of said second ring nut from said other end.

4. The system according to claim 1, wherein a shut-off valve is provided on said adapter.

5. The system according to claim 1, further comprising a ring nut screwing on said fitting to seal the hole made in the pipe.

6. The system according to claim 1, wherein said adapter comprises a hollow pipe provided at one end with a conical section on which a branch pipe can be fitted which can be fixed by a third ring nut, and provided at the other end with said second ring nut which can be screwed onto said externally threaded shank of the fitting.

7. The system according to claim 6, wherein said other end of the hollow pipe of the adapter has a diameter such as to be housed in said first section with circular cross section of said shank and externally has a step apt to prevent the removal of said second ring nut from said other end.

8. Method of mounting an adapter on a main flexible pipe of an irrigation system for the connection of a branch pipe, comprising:
   making a circular hole on said main flexible pipe;

insertion in said hole of a widened base of a fitting having an externally threaded shank, by a tool comprising a spanner;

screwing a first ring nut on said externally threaded shank by internal protrusions of the spanner for fixing the fitting on the main flexible pipe;

screwing on said externally threaded shank of the fitting a second ring nut carried by said adapter for fixing the adapter to the fitting.

9. The method according to claim 8, wherein said tool comprising a spanner has a polygonal cross section engaging with a polygonal hole provided in said shank of the fitting, and a grip with hole provided with the protrusions for engagement with an external knurling of said first ring nut.

10. The method according to claim 9, wherein said adapter comprises a hollow pipe provided at one end with a conical section on which said branch tube which can be fixed by a ring nut can be fitted, and provided at the other end with said second ring nut which can be screwed onto said externally threaded shank of the fitting.

11. The method according to claim 8, wherein said adapter comprises a hollow pipe provided at one end with a conical section on which said branch tube which can be fixed by a ring nut can be fitted, and provided at the other end with said second ring nut which can be screwed onto said externally threaded shank of the fitting.

12. The method according to claim 8, wherein a shut-off valve is provided on said adapter.

\* \* \* \* \*